United States Patent
Komatsu et al.

(12)

(10) Patent No.: US 6,233,114 B1
(45) Date of Patent: May 15, 2001

(54) DISK DRIVE

(75) Inventors: Hisateru Komatsu, Tendo; Makoto Takahashi, Obanazawa, both of (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 09/274,702

(22) Filed: Mar. 23, 1999

(30) Foreign Application Priority Data

Mar. 27, 1998 (JP) .................................................. 10-081026

(51) Int. Cl.$^7$ ...................................................... G11B 17/02
(52) U.S. Cl. .......................................................... 360/99.06
(58) Field of Search ............................. 360/99.02, 99.03, 360/99.06, 99.07

(56) References Cited

U.S. PATENT DOCUMENTS 4,878,139 * 10/1989 Hasegawa et al. ................ 360/99.06
5,025,436 * 6/1991 Crain et al. ........................ 360/99.06

FOREIGN PATENT DOCUMENTS 9-91826    4/1997  (JP) .
9-91943    4/1997  (JP) .

* cited by examiner

Primary Examiner—Robert S. Tupper
(74) Attorney, Agent, or Firm—Frishauf, Holtz, Goodman, Langer & Chick, P.C.

(57) ABSTRACT

A plurality of projected pieces 213 are provided on the surface of a main chassis 210 that is opposed to an eject plate 220 in such a manner that the projected pieces are adapted to guide sliding motion of the eject plate in contact therewith. The main chassis has first openings 214 formed therein at respective positions close to each projected piece on the main chassis. The first openings allow the sliding motion of the eject plate. First L-shaped members 222 are provided on the eject plate at positions corresponding to the first openings. The L-shaped members are each formed by means of cutting, depressing, and bending to extend from the back surface of the eject plate. Bent portions 222a of the first L-shaped members are passed through the first openings to guide the sliding motion of the eject plate along the back surface of the main chassis.

4 Claims, 4 Drawing Sheets

DISK DRIVE

BACKGROUND OF THE INVENTION

The present invention relates to a disk drive on which a magnetic disk (hereinafter, referred merely to as a disk) can be loaded and rotation driven for the purpose of recording and reproducing information, the disk comprising a flexible disk housed in a casing to magnetically record and reproduce the information. More particularly, the present invention relates to an improvement of a disk loading and unloading mechanism.

Disk drives of the type described typically receive the disk, as a received disk, for the purpose of rotation driving the received disk and recording/reproducing the information. The received disk is held by a disk table. A magnetic head for information recording/reproducing (hereinafter, referred merely to as a head) is in contact with the received disk on the disk table. The head records and reproduces the information on and from the received disk. The received disk is ejected out of the disk drive after completion of the recording and/or reproducing of the information. To this end, typical disk drives have a disk loading and unloading mechanism.

Referring to FIGS. 1 and 2, the disk loading and unloading mechanism oF a conventional disk drive is shown. In FIG. 1, the disk drive comprises a main chassis 110, an eject plate 120, and a disk holder 130, which are all made by pressing a sheet metal.

The main chassis 110 has a main base section 111, opposing side wall sections 112 and 113, a back end wall section 114, a pair of support portions 115 and another pair of support portions 116. The side wall sections 112 and 113 extend upward from the both side edges of the main base section 111. Likewise, the back end wall section 114 extends upward from the rear edge of the main base section 111. Each of the support portions 115 and 116 have shoulder portions 115a and 116a, respectively. The shoulder portion is formed by means of cutting and raising a portion of the main base section 111 with a notch formed in a part of the cut and raised portion.

A magnetic disk table 140 and a carriage mechanism 150 are mounted on the main base section 111 in the direction along the side wall sections of the main chassis 110. The magnetic disk table 140 is provided for rotation driving a disk while holding it. The carriage mechanism 150 has an upper head and a lower head which are driven by the carriage mechanism 150 on the upper (top) surface and the lower (back) surface, respectively, of the disk. A motor 160 is mounted on the back end wall section 114. The motor 160 has a rotation shaft with a helical thread thereto. The motor 160 is arranged such that the rotation shaft extends in the direction along the side wall sections of the main chassis 110.

The magnetic disk table 140 is directly connected to and rotation driven by a rotor assembly of a motor (not shown) for use in rotating the disk. The rotor assembly is provided beneath the main chassis 110. The carriage mechanism 150 has an engaging member that engages with the helical thread in the rotation shaft of the motor 160. In addition, the carriage mechanism 150 has a support frame through which a guide shaft passes. The guide shaft is fixedly secured to the main base section 111.

The engaging member of the carriage mechanism 150 moves in the direction along the side wall sections of the main chassis 110 in response to the rotation of the motor 160. This in turn moves linearly the carriage mechanism in the direction along the side wall sections of the main chassis 110, that is, the radial direction of the disk.

The eject plate 120 comprises a main base section 121, side wall sections 122 and 123 and a button mounting projection 124. The main base section 121 has a generally U shape. The side wall sections 122 and 123 extend vertically from the both side edges of the main base section 121. The button mounting projection 124 extends forward from the front edge of the main base section 121. The eject plate 120 is also provided with a pair of notches 125 and a pair of holes 126. The notches 125 and the holes 126 are formed at the position corresponding to the support portions 115 and 116, respectively, of the main chassis 110. A pair of guide grooves 127 are formed in the side wall sections 123 and 124. A bent projection 128 is provided at the rear end of the side wall section 122, projecting outward therefrom.

The guide grooves 127 each include a horizontal portion and a tilt portion. A linear gear 129 is provided in the rear portion of the main base section 121 which the linear gear is adapted to engage with a damper gear (not shown) on the main chassis 110.

The eject plate 120 is assembled with the main chassis 110 with the support portions 115 and 116 on the main chassis 110 passed through the notches 125 and the holes 126, respectively. In particular, the edges of the notches 125 and the holes 126 in the main base section 121 are supported by the shoulder portions 115a and 116a of the support portions 115 and 116, respectively. Consequently, the eject plate 120 is slidable back and forth with respect to the main chassis 110. However, the eject plate 120 is allowed to be moved only slightly in the up and down directions and the right and left directions. This is because the support portions 115 and 116 restrict the movement of the edges of the notches 125 and the holes 126 in the direction other than forward and backward. As shown in FIG. 2, the bent projection 128 on the side wall section 122 is opposed to the inner surface of the side wall section 112 on the main chassis 110 at a small gap from the inner surface.

As described above, the main base section 121 has the generally U shape. Therefore, the eject plate 120 is slidable without interrupting the operation of the disk table 140 and the carriage mechanism 150.

The disk holder 130 has a main base section 131, opposing side wall sections 132 and 133, and four protrusions 134. The four protrusions 134 are projected outward from the side wall sections. The main base section 131 has a notch 130a that is not affected by the movement of the upper head of the carriage mechanism 150. The side wall sections 132 and 133 extend downward from the both side edges of the main base section 131. The free end of the side wall sections 132 and 133 are bent inward to hold the disk. The protrusions 134 are located at the position corresponding to the guide grooves 127 in the eject plate 120.

The disk holder 130 is assembled with the eject plate 120 already assembled with the main chassis 110. During assembly, the protrusions 134 are passed through the respective guide grooves 127. The disk drive is thus configured. Alternatively, the disk drive may be assembled by means of first assembling the disk holder 130 with the eject plate 120 and then assembling the resultant combination with the main chassis 110. The disk drive of the type described is disclosed in, for example, Japanese Patent Laid-open No. 9-91826.

The disk drive disclosed herein has other features in addition to those described above. For example, a projection (not shown) mounted on the disk holder 130 is passed through a hole (not shown) formed in the main chassis 110.

With this configuration the disk holder 130 is slidable upward and downward relative to the main chassis 110 but is restricted in movement in the back and forth directions and the right and left directions. More specifically, the disk holder 130 is slidable upward and downward in cooperation with the back-and-forth movement of the eject plate 120, depending on the configuration of the guide grooves 127 formed in the eject plate 120. A tension spring (not shown) is provided between the eject plate 120 and the disk holder 130. The tension spring pulls the eject plate 120 in the forward direction relative to the main chassis 110. The eject plate 120 is locked with a locking mechanism (not shown) at a position in a rear portion of the main chassis 110 where the eject plate 120 is located against the pulling force of the tension spring. In addition, there is an eject mechanism (not shown) provided that acts on the disk in cooperation with the locking mechanism, in order to eject the disk out of the disk drive. An eject button 170 is mounted on the button mounting projection 124 to allow an operator to eject the disk. The above-mentioned features are disclosed in, for example, Japanese Patent Laid-open No. 9-91943.

Next, operation of loading and unloading the disk is described. In the absence of the disk, the eject plate 120 is at a retracted position with being locked by the locking mechanism (the tension spring is pulled). At this point, the disk holder 130 is located at an upper portion in association with the guide grooves 127 and the protrusions 134. When the disk is loaded onto the disk holder 130, the lock mechanism is released. Consequently, the tension spring causes the eject plate 120 to move forward when the spring returns to its original shape. This lowers the disk holder 130 and completes the disk loading operation. Thus the disk is now ready to be accessed to record and/or reproduce the information.

Depression of the button 170 in this state causes movement of the eject plate 120 in the backward direction. The eject plate 120 is then locked again by the locking mechanism and is kept at that retracted position (the tension spring is pulled or expanded). The disk holder 130 is located upward and the eject mechanism acts on the disk in cooperation with the lock mechanism to eject it out of the disk holder.

As apparent from the above, the track of the sliding motion of the eject plate 120 is defined by the configuration of the shoulders 115a and 116a of the support portions 115 and 116, respectively. The shoulder portions 115a and 116a each have a cut surface which is a rough edge surface, so that a problem may arise in slidability thereon. Taking this into consideration, grease is applied to a contact surface between the eject plate 120 and the shoulders 115a and 116a. However, there is a disadvantage that the grease may migrate to the inner surface of the eject plate 120 and in turn to the disk.

SUMMARY OF THE INVENTION

Therefore, an object of the present invention is to provide a disk drive that achieves smooth sliding of an eject plate by means of a main chassis.

Another object of the present invention is to provide a disk drive in which no grease is adhered to a disk from a slide guiding portion of an eject plate.

A disk drive according to the present invention comprises a disk table for rotation driving a disk loaded on the disk drive while holding the disk; a carriage mechanism for use in moving a head in the radial direction of the loaded disk, the head being used for an access to the loaded disk; a main chassis having a top surface where the disk table and the carriage mechanism are mounted in the direction along the sides of the main chassis; and an eject plate for use in ejecting the loaded disk out of the disk drive. The eject plate is assembled on the side of the top surface of the main chassis in parallel with the surface of the main chassis such that the eject plate is slidable in the back and forth direction relative to the main chassis. The disk drive further comprises a disk holder that slides in the up and down direction in response to the back and forth movement of the eject plate.

According to an aspect of the present invention, a plurality of projected pieces are provided on the surface of the main chassis that is opposed to the eject plate, the projected pieces being adapted to guide sliding motion of the eject plate in contact therewith. The main chassis has first openings formed therein at respective positions close to each projected piece on the main chassis. The first openings allow the sliding motion of the eject plate. First L-shaped members are provided on the eject plate at the positions corresponding to the first openings, the L-shaped members being formed by means of cutting, depressing, and bending a portion of the eject plate to extend from the back surface of the eject plate. The bent portions of the first L-shaped members is passed through the first openings to guide the sliding motion of the eject plate along the back surface of the main chassis.

DETAILED DESCRIPTION OF THE PREFERRED EMBODIMENT

Figure 1:
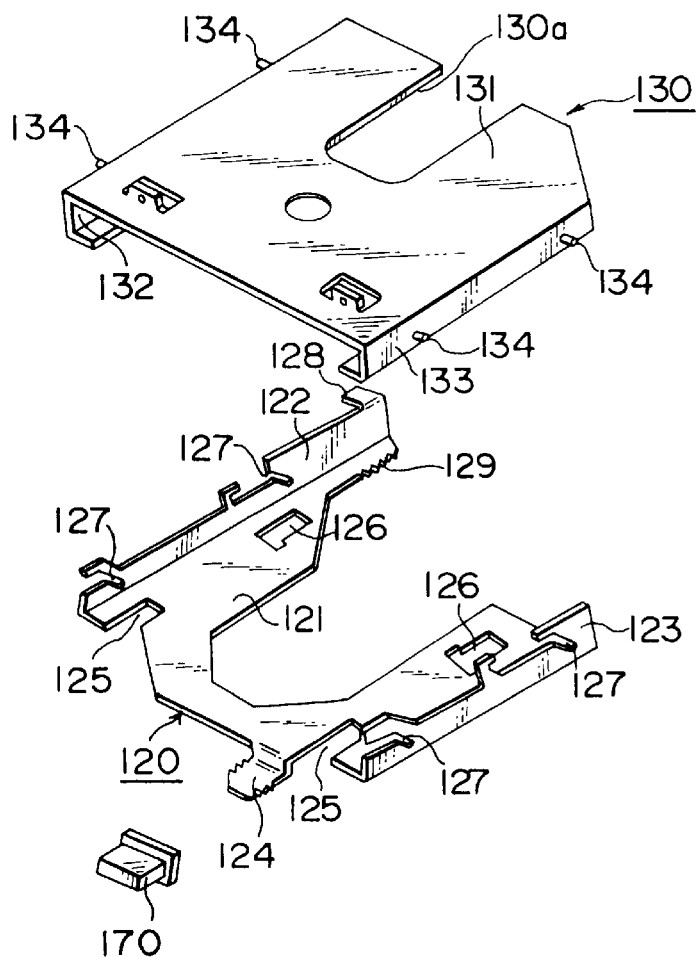
FIG. 1 is an exploded perspective view of a conventional disk drive for use in particularly describing a disk loading and unloading mechanism.
Figure 1:
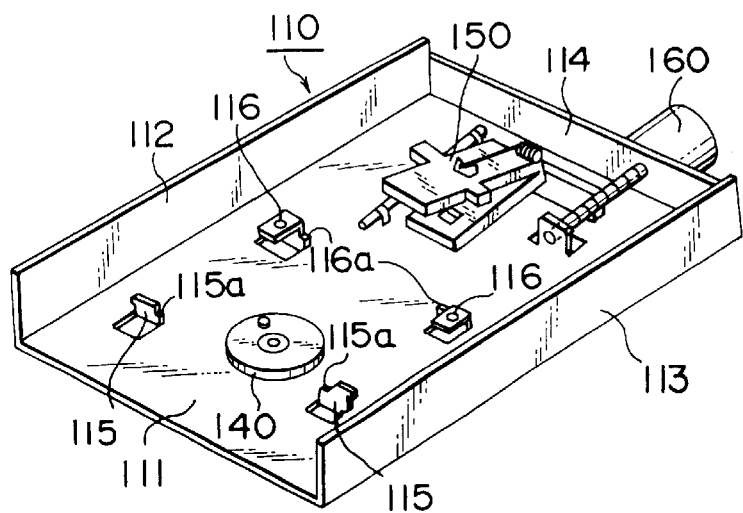
Figure 2:
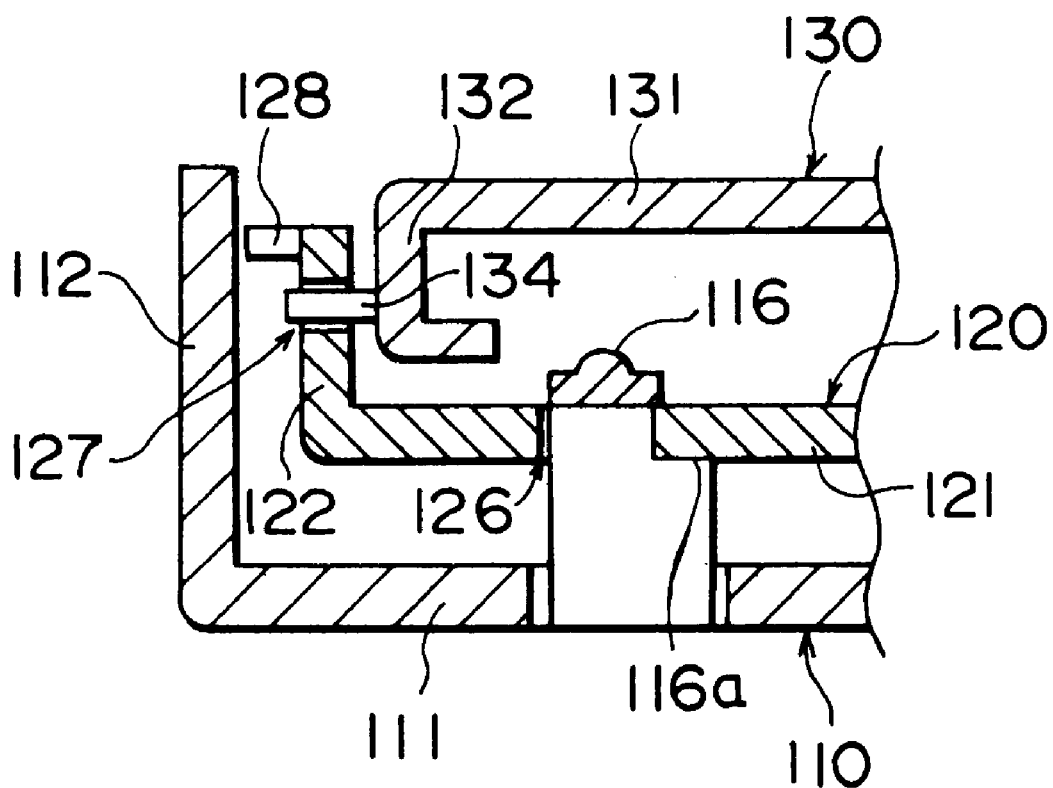
FIG. 2 is a partial cross sectional view of the disk drive in FIG. 1, in which the disk drive is illustrated as an assembled one.
Figure 3:
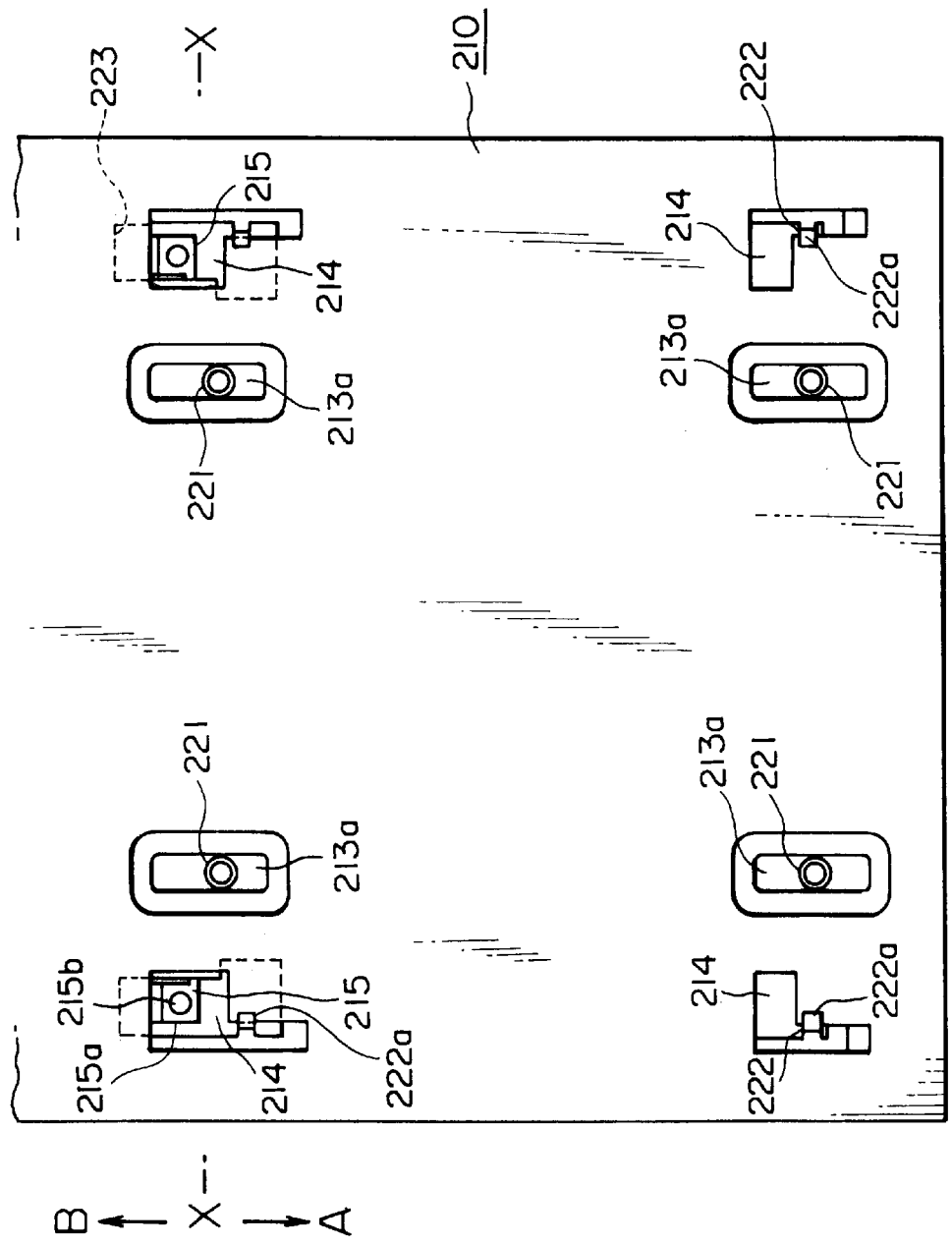
FIG. 3 is a view of a disk drive according to the present invention, in which the structure for guiding sliding motion of an eject plate is viewed from the back surface of a main chassis.
Figure 4:
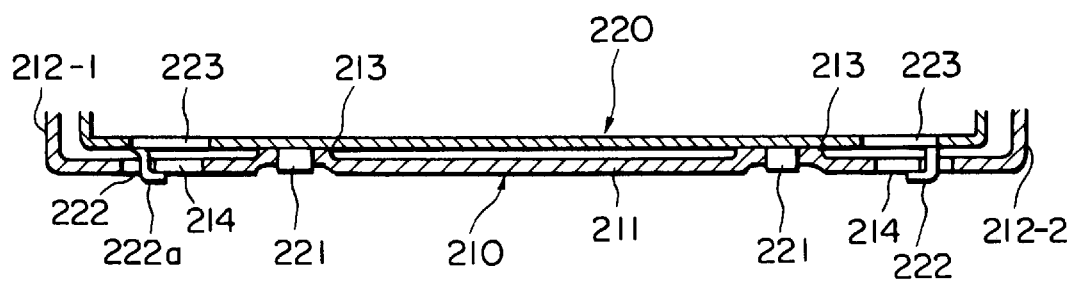
FIG. 4 is a cross sectional view taken on the line X—X in FIG. 3 and viewed in the direction depicted by an arrow A.
Figure 5:
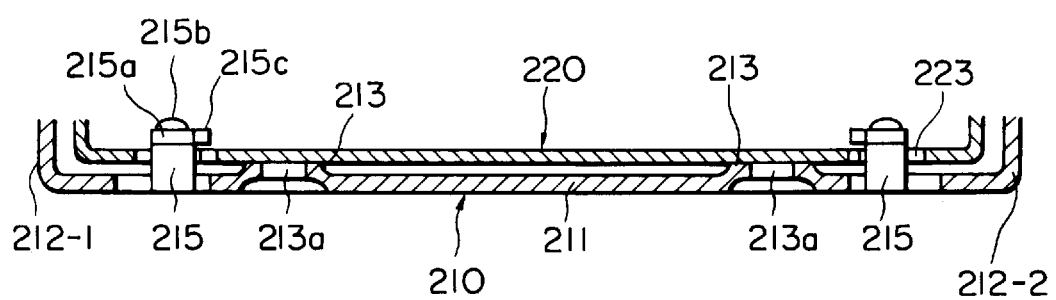
FIG. 5 is a cross sectional view taken on the line X—X in FIG. 3 and viewed in the direction depicted by an arrow B.

Referring to FIGS. 3 through 5, a preferred embodiment of the disk drive according to the present invention is described. FIG. 3 is a view of a main chassis 210 on the back side thereof. The main chassis 210 is illustrated on the different side from the carriage 150 in FIG. 1, that is, the face of the main chassis 210 illustrated is on the side where a disk is loaded. FIGS. 3 through 5 show only the components and parts necessary for slide guiding of an eject plate 220. Other components and parts are configured similar to the one as illustrated in FIG. 1.

In FIG. 4, the main chassis 210 comprises a main base section 211 and side wall sections 212-1 and 212-2 extending upward from the both side edges of the main base section 211. A top or upper surface of the main base section 211 opposing to the eject plate 220 is provided with four projected pieces 213. The projected pieces 213 are for guiding sliding motion of the eject plate 220 while abutting against to the eject plate 220. Strictly speaking, two projected pieces 213 are provided on the both sides of the main chassis 210 at a position close to the carriage mechanism 150 shown in FIG. 1. And the other two projected pieces are provided on the both sides of the main chassis 210 at a position close to a slit for receiving a disk inserted therein. The projected pieces 213 are formed by means of drawing such that they have a flat top surface. Each projected piece 213 has a generally rectangular frame shape with the longitudinal sides lying along the sliding direction of the eject plate 220. The frame is just a frame without being fitted around or over something. In other words, there is an opening 213a at the center of the frame. The main base section 211 has openings 214 (first openings) formed therein at positions close to the respective projected pieces 213 on the main chassis 210. The openings 214 allow the sliding motion of the eject plate 220.

On the other hand, eject plate 220 is provided with cylindrical members 221 at the positions corresponding to the openings 213a in the main base section 211. The cylindrical members 221 are provided on the eject plate 220 by means of drawing such that they extend from the back surface of the eject plate 220. The cylindrical members 221 are passed through the corresponding openings 213a. This allows the cylindrical members 221 to be guided along the edge of the openings 213a during the sliding motion of the eject plate 220. L-shaped members (first L-shaped members) 222 are provided on the eject plate 220 at positions corresponding to the openings 214. Each L-shaped member 222 is formed by means of cutting, depressing, and bending a portion of the eject plate 220 to extend from the back surface of the eject plate 220. Accordingly, each L-shaped member 222 has a bent portion 222a. The bent portion 222a of each L-shaped member 222 is passed through respective opening 214 and is positioned to be along the back surface of the main base section 211. As a result, the back surface of the main base section 211 serves to guide the sliding motion of the eject plate 220 through the bent portions 222a.

L-shaped members (second L-shaped members) 215 are also provided on the main base section 211 at positions corresponding to the two openings 214 in the eject plate 220 that are closer to the carriage mechanism. Each L-shaped member 215 is formed by means of cutting, raising, and bending a portion of the main base section 211 to form the opening 214. Accordingly, each L-shaped member 215 has a bent portion 215a. On the other hand, the eject plate 220 is provided with openings (second openings) 223 at positions corresponding to the L-shaped members 215. The L-shaped members 215 are projected from the top surface of the eject plate 220 through the openings 223. This results in supporting of the case for the disk with the bent portions 215a of the L-shaped members 215. Each bent portion 215a is provided with a spherical projection at the center thereof. The spherical projection has a convex surface 215b at an upper portion thereof to support the case for the disk with the disk contacting the support at points. The bent portions 215a of the two L-shaped members 215 each have a presser portion 215c along the surface of the eject plate 220.

In this embodiment, the eject plate 220 is smoothly slidable because it is achieved with the flat surface of the projected pieces 213 on the main base section 211 and the flat surface of the bent portions 222a of the L-shaped members 222. In addition, the grease to provide smoother sliding of the eject plate 220 is applied between the bent portion 222a of the L-shaped members 222 and the back surface of the main base section 211. This means that no grease will migrate or be adhered to the top surface of the eject plate 220.

As described above, according to the present invention, there is provided a disk drive that achieves smooth sliding of an eject plate by means of a main chassis and in which no grease is adhered to the disk from a slide guiding portion of the eject plate.

What is claimed is:

1. A disk drive comprising:
   a disk table that rotation drives a disk loaded on said disk drive while holding the disk;
   a carriage mechanism for use in moving a magnetic head in a radial direction of the loaded disk, said magnetic head being used to access the loaded disk;
   a main chassis having a top surface where said disk table and said carriage mechanism are mounted in a direction along sides of said main chassis;
   an eject plate for use in ejecting the loaded disk out of said disk drive, said eject plate being assembled on a top surface of said main chassis in parallel with the top surface of said main chassis such that said eject plate is slidable in a back and forth direction relative to said main chassis; and
   a disk holder that slides in an up and down direction in response to a back and forth movement of said eject plate;
   a plurality of projected pieces provided on the top surface of said main chassis that is opposed to said eject plate, said projected pieces being adapted to guide sliding motion of said eject plate in contact therewith, said main chassis having first openings formed therein at respective positions close to each of said projected pieces on said main chassis, and said first openings allowing the sliding motion of said eject plate; and
   first L-shaped members provided on said eject plate at respective positions corresponding to said first openings, said first L-shaped members being formed by cutting, depressing, and bending portions of said eject plate to extend from a back surface of said eject plate, and the bent portions of said first L-shaped members being passed through said first openings to guide the sliding motion of said eject plate along a back surface of said main chassis.

2. A disk drive as claimed in claim 1, further comprising second L-shaped members provided on said main chassis at respective positions corresponding to said first openings that are close to said carriage mechanism, each second L-shaped member being formed by cutting, raising, and bending such that said second L-shaped members extend towards the top surface of said main chassis; and
   wherein said eject plate is provided with second openings at respective positions corresponding to said first openings that are close to said carriage mechanism, said second L-shaped members being passed through said second openings and projected from the top surface of said eject plate to support said disk with the bent portions of said second L-shaped members.

3. A disk drive as claimed in claim 2, wherein said projected pieces are formed by drawing on the sides of said main chassis at two positions close to said carriage mechanism and at another two positions close to a slit for receiving the disk inserted therein.

4. A disk drive as claimed in claim 3, wherein the bent portions of respective ones of said second L-shaped members that are provided at the two positions close to said carriage mechanism are each provided with a presser portion such that the presser portion is along the top surface of said eject plate.

* * * * *